US012130947B2

(12) United States Patent
Klimov et al.

(10) Patent No.: US 12,130,947 B2
(45) Date of Patent: Oct. 29, 2024

(54) SYSTEM AND METHOD FOR DECREASING THE NUMBER OF FINGERPRINTS IN DIGITAL FINGERPRINT LIBRARY

(71) Applicant: Acronis International GmbH, Schaffhausen (CH)

(72) Inventors: Ivan Klimov, Schaffhausen (CH); Serg Bell, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 105 days.

(21) Appl. No.: 17/936,405

(22) Filed: Sep. 29, 2022

(65) Prior Publication Data

US 2024/0111901 A1    Apr. 4, 2024

(51) Int. Cl.
G06F 21/62    (2013.01)

(52) U.S. Cl.
CPC .............................. G06F 21/6272 (2013.01)

(58) Field of Classification Search
CPC ................................................ G06F 21/6272
USPC ........................................................ 726/30
See application file for complete search history.

(56) References Cited

U.S. PATENT DOCUMENTS

| | | | |
|---|---|---|---|
| 10,282,257 B2 | 5/2019 | Aronovich et al. | |
| 10,387,265 B1 | 8/2019 | Pogosyan et al. | |
| 10,817,542 B2 | 10/2020 | Aseev et al. | |
| 2003/0039381 A1* | 2/2003 | Ziesig ............... | G06V 40/1365 382/124 |
| 2022/0236904 A1 | 7/2022 | Miller et al. | |
| 2023/0385455 A1 | 11/2023 | Berko et al. | |

FOREIGN PATENT DOCUMENTS

| | | |
|---|---|---|
| CN | 110083743 A | 8/2019 |
| CN | 111104484 B | 9/2021 |
| CN | 113779597 A | 12/2021 |
| SG | 10201801632 | 9/2019 |

* cited by examiner

*Primary Examiner* — Michael S McNally
(74) *Attorney, Agent, or Firm* — ESPE Legal Consultancy FZ-LLC

(57) ABSTRACT

The present disclosure relates to a system and method implemented for lowering the number of fingerprints of fragments of a file added to the digital fingerprint library using a winnowing window method. The digital fingerprint library stores fingerprints of fragments of files matching certain criteria, e.g., containing protected information. When an unknown file is examined, that library is used to compare fingerprints of fragments of size N from the unknown file to the fingerprints stored in the library. The method automatically determines criteria for adding fingerprints to the digital fingerprint library or skipping them.

17 Claims, 2 Drawing Sheets

SYSTEM AND METHOD FOR DECREASING THE NUMBER OF FINGERPRINTS IN DIGITAL FINGERPRINT LIBRARY

FIELD OF THE INVENTION

The present disclosure generally relates to data security. In particular, the present disclosure relates to a system and method for optimizing the method of digital fingerprint library creation with a sliding window, using a winnowing. The winnowing method comprises adding only fingerprints of certain fragments of a file to the digital fingerprint library while not adding others according to certain criteria.

BACKGROUND OF THE INVENTION

With the advent of digital technology and ever evolving cyber security thefts, data security has become a critical issue in all aspects of computer technology. Many enterprises, corporations, unions, organizations, and other entities possess valuable digital information that is vulnerable to theft or unauthorized disclosure. Document fingerprinting is a technique to prevent data leaks. For each document containing protected data, a fingerprint is calculated and stored in a digital database. A document that a user intends to share is compared against such a digital database. If the document's fingerprint is found in the database, the system may identify that document as a document containing protected data.

Such a document fingerprinting process allows for identification of files that exactly match one of the previously collected files known to contain protected data, but it does not catch documents that contain fragments of such files that exist within other documents.

SUMMARY OF THE INVENTION

The present disclosure relates to a system and method for decreasing the number of fingerprints of the fragments of length N (N-fragments) created using a sliding window method to be stored in a digital fingerprint library by using winnowing.

The process of winnowing determines which fingerprints of N-fragments of a file containing protected information are added to the digital fingerprint library, and which fingerprints are not.

The winnowing process uses a value $M>N$. In case of the simplest sliding window process, M denotes the length of a winnowing window.

The winnowing process uses N-fragments generated by the sliding window process and is described by its initial step and iterations.

A function F(Fingerprint(i)) is defined such as the value of the function for two different fingerprints is different, and for each two different fingerprints Fingerprint(i) and Fingerprint(j), either $F(Fingerprint(i))>F(Fingerprint(j))$ or $F(Fingerprint(i))<F(Fingerprint(j))$. Accordingly, for a set of fingerprints, a Max(F(set)) and a Min(F(set)) can be determined.

In an embodiment, the function F outputs the numeric value of the fingerprint.

The winnowing algorithm may use the "less" condition and minimum function or "more" condition and maximum function as described below. For the demonstration purposes, the "less" condition and minimum function are used.

The initial step of the winnowing process starts with calculating fingerprints, e.g., hashes, of first M−N+1 N-fragments generated by the sliding window process.

In the case of a sliding window process that starts with the first symbol and moves by one symbol with each iteration, M is the size of the winnowing window that covers continuous (M−N+1) N-fragments.

Only the fingerprint of one fragment from these M−N+1 N-fragments is added to the digital fingerprint library. It is the fragment such that the value of the function F for the fingerprint of that fragment, e.g., the numeric value of the hash of that fragment, equals to the minimum of all values of the function F of all fingerprints of all M−N+1 fragments generated by the sliding window algorithm starting with step 1.

The value of the function F on the fingerprint of the fragment that was last added to the library becomes the value V(1).

The counter Z(1) is set to 0.

To move from step i to step i+1, the method first checks for the condition to end the process, e.g., if $K-C(i+1)<N$ where K is the length of a file, C is the position of the first symbol of the fragment. If the ending criteria is met, the method ends.

If the ending criteria is not met, the sliding window method generates a N-fragment number i+1.

Then, the fingerprint of that fragment is calculated.

The function F of the fingerprint of that fragment is calculated. For example, the function F may be the numeric hash value.

If the value of function F is less than V(i), the fingerprint of that fragment is added to the digital fingerprint library, V(i+1) is set to the value of function F for the fingerprint of that fragment, and counter Z(i+1) is set to 0.

If the value of function F is not less than V(i), the fingerprint of that fragment is not added to the digital fingerprint library, the value of V(i+1) stays the same as the value of V(i), and the counter Z(i+1) is increased by 1, i.e., $Z(i+1)=Z(i)+1$.

Next, the method checks the value of the counter Z(i+1) to see how many fingerprints of continuous N-fragments were not added to the digital fingerprint library.

If $Z(i+1)=M-N+1$, i.e., M−N+1 fingerprints of continuous N-fragments generated by the sliding window method were not added to the digital fingerprint library, a minimum value of function F on these M fragments is calculated. The fingerprint of the fragment such that the value of the function F for the fingerprint of that fragment, e.g., the numeric value of the hash of that fragment, equals to the minimum of all values of the function F of all fingerprints of all M−N+1 fragments M−N+1 fingerprints of continuous N-fragments generated by the sliding window method ending with the step i+1.

The value of the function F on the fingerprint of the fragment that was last added to the library becomes the value V(i+1).

The counter Z(i+1) is set to 0.

In an embodiment, a method for decreasing the number of fingerprints of fragments for building a digital fingerprint library from an individual file of length K is described. The method comprises applying a sliding window method to generate a certain number of fragments of length N, N-fragments, from the file; generating fingerprint values for each N-fragment and using the winnowing method to determine which fingerprints of N-fragments are added to the digital fingerprint library.

In an embodiment, the step of determining the length of a winnowing window M is performed heuristically.

In an embodiment, the step of determining the length of a fragment N is performed heuristically.

In an embodiment, the step of establishing comparative relationship between the fingerprint values comprises comparing numerical values of fingerprints and determining a lower numerical value.

In an embodiment, the step of establishing comparative relationship between the fingerprint values comprises comparing numerical values of fingerprints and determining a higher numerical value.

In an embodiment, the method comprises determining the smallest numeric value of a fingerprint of several fingerprints.

In an embodiment, the method comprises determining the highest numeric value of a fingerprint of several fingerprints.

In accordance with one embodiment, the system is implemented to decrease the number of fingerprints of fragments for building a digital fingerprint library. The system comprises an N-fragment generator using the sliding window method and a winnowing selector that determines which signatures of N-fragments are added to the digital fingerprint library and adds these fingerprints to the library.

The foregoing general description of the illustrative embodiments and the following detailed description thereof are merely exemplary aspects of the teachings of this disclosure and are not restrictive.

DETAILED DESCRIPTION

A digital fingerprint library comprises a database or a library where fingerprints of N-fragments, i.e., fragments of size N, of files containing protected data are stored.

Protected information comprises information including trade secrets, patented data, confidential and proprietary business information of the company and any other information of the company, including, but not limited to, customer lists (including potential customers), sources of supply, processes, plans, materials, pricing information, internal memoranda, marketing plans, internal policies, and products and services that may be developed from time to time by the company and its agents or employees. Protected information is also a form of protected data.

A winnowing window comprises the use of the winnowing method with the sliding window method that starts at the first symbol of the file and moves one symbol towards the end of the file with each iteration. In that case, the first continuous (M−N+1) N-fragments fit into a window of size M.

The present disclosure relates to a system and method for decreasing the number of fingerprints of fragments added into the Digital Fingerprint Library for each file containing protected information.

Figure 1:
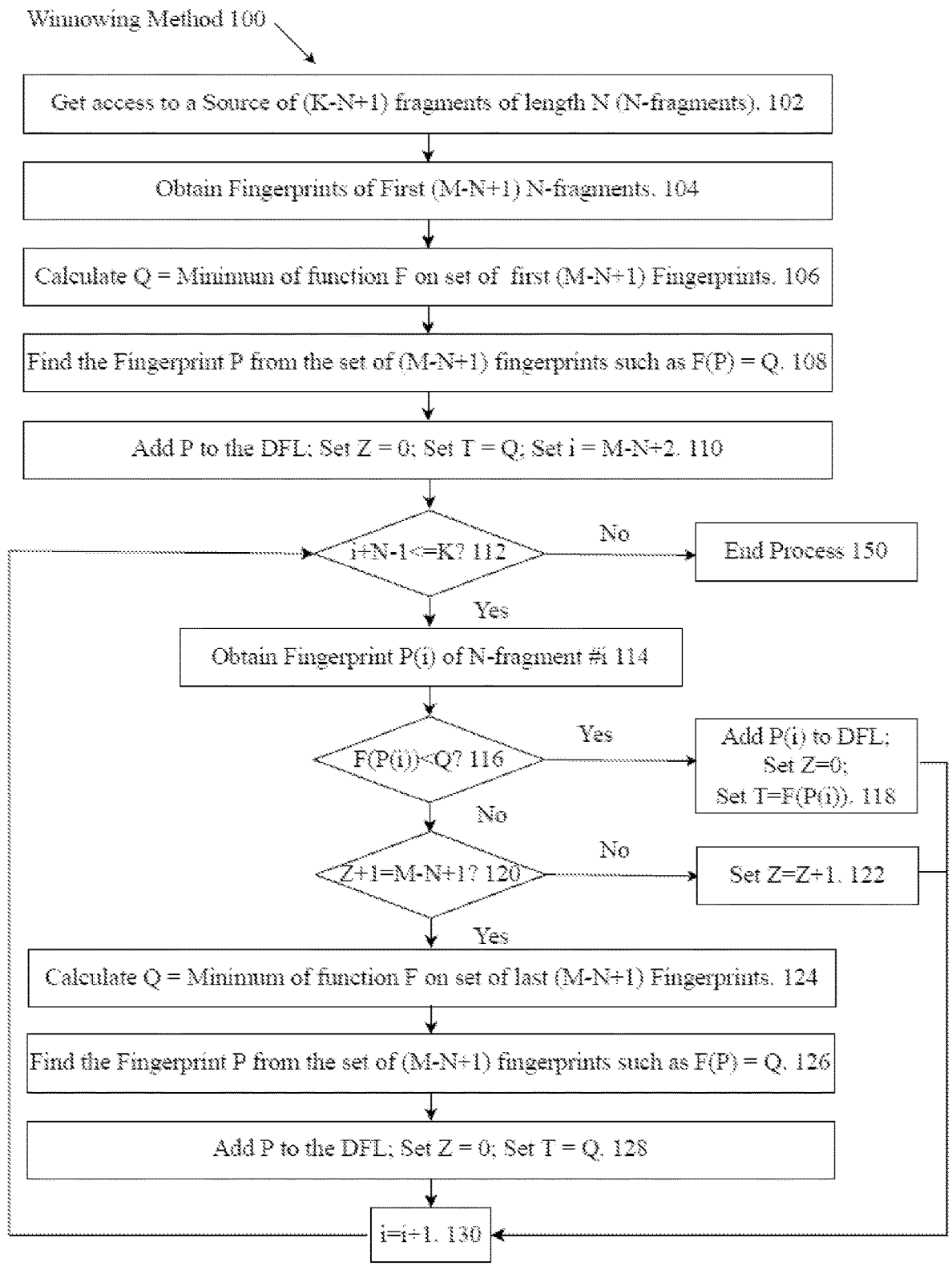
FIG. 1 is a block diagram of the generic willowing method, in accordance with one embodiment.

FIG. 1 is an overview of a generic winnowing method 100.

At step 102, the method gets access to a source of (K−N+1) fragments of length N, the N-fragments, where K and N are natural numbers such as K>N.

In an embodiment, that source is a file and (K−N+1) N-fragments are generated by a sliding window method that starts with the symbol S(1), has an iteration step of C(i) symbols, and stops when certain criteria is met thus producing K−N+1 fragments.

In an embodiment, that source is a file K symbols long and N-fragments are generated by a sliding window method that starts with the first symbol, has an iteration step of 1 symbol, and stops at the last N-fragment at the end of the file hence producing (K−N+1) N-fragments.

In an embodiment, the source of these N-fragments is a database.

In an embodiment, the source of these N-fragments is computer RAM memory.

In an embodiment, the source of these N-fragments is a local drive on a computer.

In an embodiment, the source of these N-fragments is a network storage location.

In an embodiment, the source of these N-fragments is a mobile device.

At step 104, fingerprints of the first (M−N+1) N-fragments are obtained.

In an embodiment, these first N-fragments are obtained using the first (M−N−1) N-fragments using the sliding window method where N is a natural number such as N<M<K.

In an embodiment, these first (M−N−1) N-fragments are obtained using the sliding window method that starts with the symbol S(1), has an iteration step of C(i) symbols, and stops when certain criteria are met.

In an embodiment, these first (M−N−1) N-fragments are obtained using the sliding window method that starts at the first symbol of the file, has an iteration step of 1 symbol, and stops when at the last N-fragment at the end of the file hence producing the total of (K−N+1) N-fragments. In this embodiment, the size of the winnowing window that covers the first (M−N+1) N-fragments equals to M.

In an embodiment, the fingerprint of each fragment is the fragment itself.

In an embodiment, the fingerprint of each fragment is its hash value.

At step 106, a minimum Q is calculated of all values of the function F for all fingerprints for each of the initial (M−N+1) fragments where function F is such that for every two different fingerprints P1 and P2, either F(P1)>F(P2) or F(P1)<F(P2).

In an embodiment, the values of F(P(i)) are calculated from the values of fingerprints P(i) from the set of first (M−N+1) fingerprints before the minimum is calculated.

At step 108, a fingerprint P is located such F(P)=Q. Such fingerprint will always exist because the minimum of a function on a finite set is always achieved on a member of that set.

For this disclosure and identification of the fingerprint P, calculating the minimum of the function F(x) on a certain set of 1 or more items is equivalent to calculating the maximum of the function −F(x) on the same set, and later multiplying that maximum by (−1)

At step 108, several sub-steps are taken in arbitrary order. These sub-steps are adding the fingerprint P to the digital fingerprint library, setting T, the current minimum value of function F to Q, setting the counter of skipped fingerprints Z to zero, and setting the iterator i to the next N-fragment after the initial set of (M−N+1) fragments.

Step 112 checks if there are any N-fragments left to process.

If there are no more N-fragments to process, the method moves to end the process 150.

If there is at least one more N-fragment to process, the method moves to step 114 where the fingerprint P(i) is obtained of the N-fragment #i.

In an embodiment, the fingerprint is calculated in the same step.

In an embodiment, the N-fragment #i is generated in the same step from a file using the sliding window method.

At step 116, the value of F(P(i)) is compared against Q, the last recorded lowest value of the function F.

If F(P(i))<Q, then the process moves to 118 where two sub-steps are taken in arbitrary order: setting the counter of skipped fingerprints Z=0 and setting T, the current minimum value of function F, to F(P(i)).

Once step 118 completes, the control goes to step 130 where the iteration counter is increased by 1.

When the comparison at step 116 yields a negative result, the control goes to step 120.

At step 120, the current value of the counter of skipped fingerprints Z is compared against the value of M−N+1. When the signature #i is skipped, the counter Z still contains the value from the previous iteration, hence when the fingerprint #i is not added to the digital fingerprint library, i.e., skipped, the total number of skipped fingerprints equals to Z+1. Step 120 checks if Z+1=M−N+1.

In an embodiment, the fragments are produced using the sliding window method that starts at the first symbol of the file and iteration step of 1. In that case, M is the size of the winnowing window that covers M−N+1 continuous N-fragments.

If step 120 determines that the total number of skipped fingerprints including the fingerprint #i equals to M−N+1, control is passed to step 124.

Step 124 calculates the minimum value Q of function F on the last M−N+1 fingerprints (all the skipped fingerprints).

Step 126 identifies fingerprint P such that F(P)=Q.

Step 128 contains several steps taken in arbitrary order: adding fingerprint P to the digital fingerprint library, setting the counter of skipped fingerprints Z to 0, setting T, the current minimal value of function F to Q.

Once Step 128 finishes, control goes to step 130 where the iteration counter is increased by 1.

In an embodiment, the increase of the iteration counter step is performed as a part of one of the steps 114 to 128.

When step 120 yields a negative result, i.e., the total number of skipped fingerprints including the current fingerprint is lower than M−N+1, then control goes to step 122.

At step 122, the counter Z of skipped fingerprints is increased by one: Z=Z+1.

From step 122 the control goes to step 112.

Figure 2:
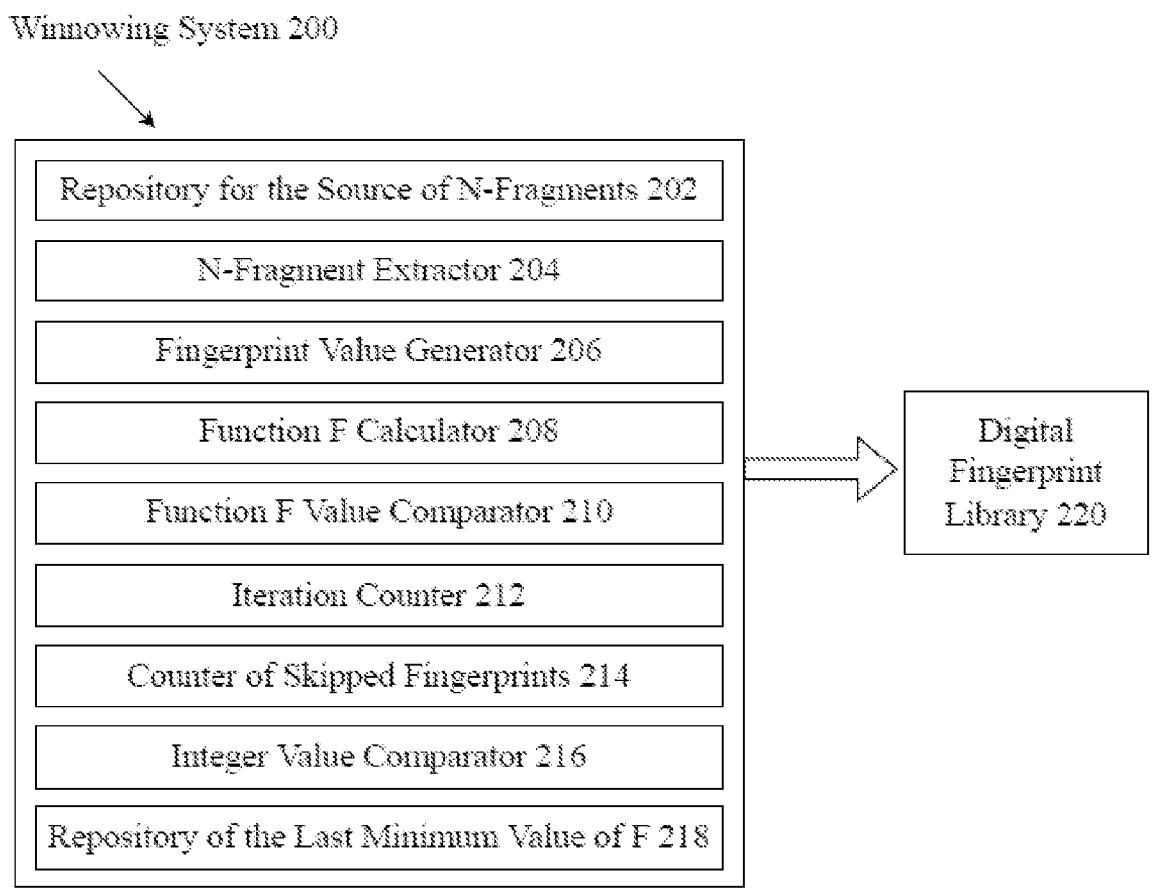
FIG. 2 is a block diagram of the system that implements the willowing method.

FIG. 2 is a block diagram of the system that implements the winnowing method described in FIG. 1.

Winnowing system 200 is capable of selecting which fingerprints of N-fragments from the repository 202 are added to the Digital Fingerprint Repository 220 and which ones are skipped.

Winnowing system 200 consists of several components.

The repository for the source of the N-fragments 202 is a collection of data that can be used to generate N-fragments for further processing by the winnowing method.

In an embodiment, this repository is a file.

In an embodiment, this repository is a database.

In an embodiment, this repository is a collection of files.

In an embodiment, this repository is located on a local hard drive of a computer.

In an embodiment, this repository is located on a cloud storage device.

In an embodiment, this repository is located on a mobile device.

N-fragment extractor 204 is a unit that extracts the next fragment of size N from the repository 202.

In an embodiment, the extractor implements a sliding window algorithm to extract N-fragments from a file.

Fingerprint value generator 206 is a unit capable of calculating the fingerprint value for each of the N-fragments generated from the repository 202.

In an embodiment, the fingerprint value generator is the fingerprint of the N-fragment is the N-fragment itself.

In an embodiment, the fingerprint value generator generates a hash of the N-fragment.

Function F calculator 208 is a unit configured to calculate the value of Function F for each fingerprint generated by the fingerprint generator 206 for each of the N-fragments. Function F is such a function that for every two distinct fingerprints P1 and P2, either F(P1)>F(P2) or (F(P1)<F(P2).

In an embodiment, function F is the digital value of the fingerprint.

Function F Value Comparator 210 is a unit configured to take two or more output values of function F as its input and selects a minimal one of them.

Iteration counter 212 is a unit configured for storing an integer number corresponding to the iteration step of the winnowing method.

Counter of Skipped Fingerprints 214 is a unit configured for storing a non-negative whole number corresponding to the number of skipped fingerprints in the winnowing method.

Integer Value Comparator 216 is configured for comparing two integer values and outputting the logical result of the operation, e.g., for steps 116 and 120 of the winnowing method 100.

The Repository of the Last Minimum Value of Function F 218 is configured for storing the last minimum value of function F, e.g., in steps 110 and 128 of the winnowing method 100.

The invention claimed is:

1. A method for building a digital fingerprint library in a nontransitory storage medium with an optimized number of fingerprints of fragments of length N, the method comprising:

accessing a source of digital data comprising (K−N+1) fragments, of length N, where K is a natural number such that K>N;

obtaining fingerprints of the first (M−N+1) fragments, where M is a natural number such that K>M>N;

using a function F, calculating the minimum Q of the values of function F for all fingerprints of all first (M−N+1) fragments of size N, where function F is such that for each two distinct digital fingerprints P1 and P2, either F(P1)>F(P2) or F(P1)<F(P2);

selecting a signature P from the set of signatures of first (M−N+1) fragments of length N such that F(P)=Q;

adding fingerprint P to the digital fingerprint library in the nontransitory storage medium;

setting the counter of skipped fingerprints Z to 0;

setting T, the value of the current minimal value of the function F, to Q;

setting an iteration counter i to M−N+2;

while i+N−1<=K, obtaining fingerprint P(i) of the N-fragment number I generated from the source of fragments; and comparing the value of the function F for that fingerprint P(i) to Q; and if F(P(i))<Q, adding fingerprint P(i) to the digital fingerprint library in the nontransitory storage medium repository;

setting a counter of skipped digital fingerprints Z to 0;

setting T, the current lowest value of function F, to F(P(i)); and increasing an iterator counter by one; and if F(P(i))>=Q, skipping the current fingerprint and checking if the total number of skipped fingerprints Z plus 1 for current skipped fingerprint equals M−N+1; and if Z+1 does not equal M−N+1, increasing the counter of skipped digital fingerprints Z by one;

increasing an iteration counter by one; or returning to step f; and if Z+1 equals M−N+1, using a function F, calculating the minimum Q of the values of function F for all fingerprints of all last (M−N+1) fragments of size N ending with fragment number i; and selecting a signature P from the set of signatures of the last (M−N+1) fragments of length N ending with fragment number i such that F(P)=Q;

adding fingerprint P to the digital fingerprint library in;

setting the counter of skipped fingerprints Z to 0;

setting T, the value of the current minimal value of the function F to Q; and increasing the iteration counter i by one; and saving the state of the digital fingerprint library in the nontransitory storage medium.

2. The method of claim 1, wherein the step of obtaining fingerprints of first (M−N+1) fragments of length N is implemented using a sliding window method from a file.

3. The method of claim 1, wherein the step of obtaining fingerprints of first (M−N+1) fragments of size N further comprises calculating the fingerprint from a fragment of size N.

4. The method of claim 1, wherein the fingerprint of the fragment of size N equals that fragment.

5. The method of claim 1, wherein the fingerprint of the fragment of size N is a hash function.

6. The method of claim 1, wherein function F is a conversion of a fingerprint to its digital value.

7. A computing system to lower the number of fingerprints of fragments of size N for building a digital fingerprint library, comprising:

a microprocessor coupled to a nontransitory storage medium;

a repository of the digital data comprising a source for fragments of size N configured to enumerate such fragments of size N and output a fragment of size N located at a position i such that i<=K−N+1 where K−N+1 is the total number of fragments of size N in the source;

a fragment of size N extractor, under program control of the microprocessor, configured to receive a fragment of a size N generated from the source located at a position i;

a fingerprint value generator, under program control of the microprocessor, configured to generate a value for each fragment of size N;

a function F calculator, under program control of the microprocessor, configured to accept a fingerprint as an input and to output a value for each digital fingerprint, function F is such that for each two distinct digital fingerprints P1 and P2, either F(P1)>F(P2) or F(P1)<F(P2);

a function F value comparator, under program control of the microprocessor, configured to accept as input two or more output values of function F and output the minimal value of the set;

an iteration counter, under program control of the microprocessor, configured to store a natural number corresponding to the iteration counter i;

a counter of skipped fingerprints, under program control of the microprocessor, configured to store a natural number Z corresponding to the current number of skipped fingerprints at different steps of the winnowing algorithm;

an integer value comparator, under program control of the microprocessor, configured to compare two integers and output a logical value corresponding to the result of the comparison;

a repository of digital data comprising the last minimal value of function F configured to store a value output by function F;

a nontransitory storage medium comprising a digital fingerprint library configured to store a digital fingerprint value.

8. The system of claim 7, wherein the source of fragments of size N is a file.

9. The system of claim 7, wherein the source of fragments of size N is a database comprising a storage medium.

10. The system of claim 7, wherein the source of fragments of size N is a collection of files.

11. The system of claim 7, wherein the repository is located at a local drive of a personal computer.

12. The system of claim 7, wherein the repository is located on a network drive or in the cloud.

13. The system of claim 7, wherein the repository is located on a mobile device.

14. The system of claim 7, wherein the function F converts the fingerprint to its digital representation in computer storage.

15. The system of claim 7, wherein the extractor of fragments of size N is further configured to use a sliding window method to generate a fragment.

16. The system of claim 7, wherein the fingerprint of a fragment is its hash.

17. The system of claim 7, wherein the fingerprint of a fragment equals the fragment.

* * * * *